United States Patent
Coard

(10) Patent No.: US 9,111,264 B2
(45) Date of Patent: Aug. 18, 2015

(54) SYSTEM AND METHOD FOR PRE-EVALUATION VEHICLE DIAGNOSTIC AND REPAIR COST ESTIMATION

(71) Applicant: Precision Auto Repair Center of Stamford, LLC, Bridgeport, CT (US)

(72) Inventor: Christopher C. Coard, Bridgeport, CT (US)

(73) Assignee: PRECISION AUTO REPAIR CENTER OF STAMFORD, LLC, Bridgeport, CT (US)

(*) Notice: Subject to any disclaimer, the term of this patent is extended or adjusted under 35 U.S.C. 154(b) by 0 days.

(21) Appl. No.: 14/324,495

(22) Filed: Jul. 7, 2014

(65) Prior Publication Data

US 2015/0012169 A1 Jan. 8, 2015

Related U.S. Application Data

(60) Provisional application No. 61/843,546, filed on Jul. 8, 2013.

(51) Int. Cl.
*G06Q 10/00* (2012.01)
*G06Q 20/20* (2012.01)
*G06Q 10/06* (2012.01)
*G07C 5/08* (2006.01)

(52) U.S. Cl.
CPC .......... *G06Q 10/20* (2013.01); *G06Q 10/06316* (2013.01); *G06Q 20/202* (2013.01); *G07C 5/0808* (2013.01)

(58) Field of Classification Search
CPC ............ G06Q 10/20; G06Q 10/06311; G06Q 10/06316; G06Q 20/20; G06Q 20/201; G06Q 20/202; G07C 5/08; G07C 5/008
See application file for complete search history.

(56) References Cited

U.S. PATENT DOCUMENTS

| | | | |
|---|---|---|---|
| 5,508,977 A | 4/1996 | Tymn | |
| 5,701,400 A | 12/1997 | Amado | |
| 5,765,138 A | 6/1998 | Aycock et al. | |
| 6,070,155 A * | 5/2000 | Cherrington et al. | 705/400 |
| 7,096,101 B2 * | 8/2006 | Sonnenrein et al. | 701/31.5 |
| 7,206,965 B2 | 4/2007 | Roddy et al. | |
| 7,209,817 B2 | 4/2007 | Abdel-Malek et al. | |
| 7,373,225 B1 * | 5/2008 | Grier et al. | 701/29.6 |
| 7,536,277 B2 | 5/2009 | Pattipatti et al. | |

(Continued)

FOREIGN PATENT DOCUMENTS

EP 1164550 A2 12/2001

OTHER PUBLICATIONS

Auto Shop Management Software, downloaded May 31, 2013, available at http://www.mitchell.com/auto-repair-shopsoftware/shop-management-software/modules-repair-process-estimating.asp.

(Continued)

*Primary Examiner* — Jerrah Edwards
*Assistant Examiner* — Tamara Weber
(74) *Attorney, Agent, or Firm* — Gordon & Jacobson, PC

(57) ABSTRACT

Systems and methods are provided for estimating a diagnosis of a vehicle in need of repair in advance of performing any diagnostic tests on the vehicle. The invention further estimates the costs for a repair to a vehicle in need of repair in advance of performing any diagnostic tests to the vehicle. The system is particularly useful at a point-of-sale system in a vehicle repair center or in a off-site customer access tool.

31 Claims, 10 Drawing Sheets

(56) References Cited

U.S. PATENT DOCUMENTS

| | | |
|---|---|---|
| 7,620,484 B1 | 11/2009 | Chen |
| 7,865,278 B2 | 1/2011 | Underdal et al. |
| 8,015,138 B2 | 9/2011 | Illiff |
| 8,024,084 B2 | 9/2011 | Breed |
| 8,145,377 B2 | 3/2012 | Gilbert |
| 8,229,624 B2 | 7/2012 | Breed |
| 8,412,537 B1 | 4/2013 | Fenton et al. |
| 2002/0007289 A1* | 1/2002 | Malin et al. ......................... 705/4 |
| 2002/0038262 A1* | 3/2002 | Fukuda et al. ................... 705/27 |
| 2003/0055666 A1 | 3/2003 | Roddy et al. |
| 2004/0034566 A1* | 2/2004 | Nagata ............................. 705/22 |
| 2004/0167689 A1* | 8/2004 | Bromley et al. ................ 701/29 |
| 2005/0222723 A1* | 10/2005 | Estes et al. ....................... 701/33 |
| 2007/0043614 A1 | 2/2007 | Daher et al. |
| 2007/0202857 A1 | 8/2007 | Hara |
| 2008/0004840 A1 | 1/2008 | Pattipatti et al. |
| 2008/0214949 A1 | 9/2008 | Stivoric et al. |
| 2009/0018859 A1* | 1/2009 | Purifoy et al. .................... 705/1 |
| 2009/0062978 A1* | 3/2009 | Picard .............................. 701/29 |
| 2009/0089134 A1* | 4/2009 | Uyeki ................................ 705/9 |
| 2010/0241481 A1 | 9/2010 | Apostolidis |
| 2010/0274571 A1* | 10/2010 | McFall et al. .................. 705/1.1 |
| 2012/0084092 A1 | 4/2012 | Kozuch et al. |
| 2014/0074865 A1* | 3/2014 | Zobrist et al. ................. 707/749 |
| 2014/0279709 A1* | 9/2014 | Lander et al. .................. 705/400 |

OTHER PUBLICATIONS

Mitchell Repair Center Brochure, 2011.
The Ultimate Diagnostic Resource, SureTrack Mitchell 1, downloaded Jul. 9, 2013, available at http://mitchell1.com/main/prodemand-home/suretrack.

* cited by examiner

FIG. 4A

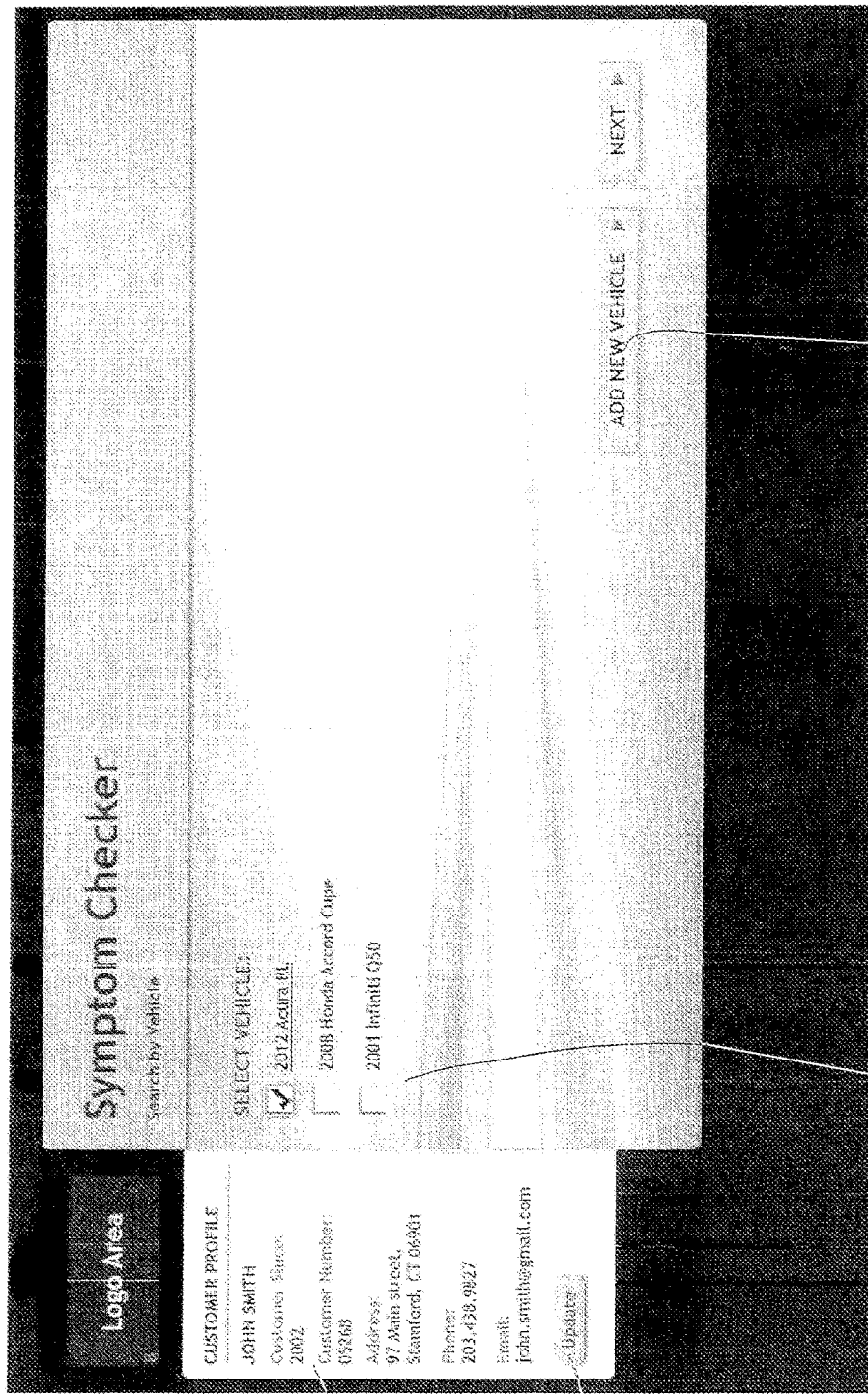

FIG. 4E

SYSTEM AND METHOD FOR PRE-EVALUATION VEHICLE DIAGNOSTIC AND REPAIR COST ESTIMATION

CROSS REFERENCE TO RELATED APPLICATION

This application claims benefit of U.S. Provisional Ser. No. 61/843,546, filed Jul. 8, 2013, which is hereby incorporated by reference herein in its entirety.

BACKGROUND OF THE INVENTION

1. Field of the Invention

The present invention relates to systems and methods for estimating a diagnosis of a mechanical system in need of a repair prior to evaluating the mechanical system, as well as systems and methods for estimating the costs to repair the mechanical system in view of the estimated diagnosis. More particularly, the invention relates to such systems and methods where the mechanical systems are automotive vehicles.

2. State of the Art

Automotive vehicles are complex mechanical system and, at times, break down or fail to operate at optimum performance such that repair or servicing is necessary. When a potential customer brings a vehicle to a vehicle service center (VSC) for servicing, it is difficult to provide a diagnosis of the problem before an experienced technician connects a diagnostic code reader to the vehicle's computer and analyzes diagnostic codes received from the vehicle's computer, places the vehicle on a lift and physically examines the vehicle, and/or takes the vehicle for a test drive. In addition, limited technician resources at a VSC can result in significant wait times before a vehicle is evaluated. Therefore, in order for the potential customer to receive diagnostic feedback as to the problem or otherwise service the vehicle, as well as an estimate of the costs to repair the problem, the vehicle may need to be left at the VSC for an uncertain period of time before the results of any diagnostics are reported to the potential customer. This can greatly inconvenience or frustrate the potential customer. Further, as some potential customer may be unwilling to wait or leave the vehicle for the time required for the initial diagnostics, the potential customer may leave without having the appropriate repair performed which can result in lost revenue for the VSC.

SUMMARY OF THE INVENTION

This summary is provided to introduce a selection of concepts in simplified form that are further described below in the Detail Description of the Preferred Embodiments. This summary is not intended to identify all of the key features of the claimed subject matter, nor is it intended to be used as an aid in determining the scope of the claimed subject matter.

The present invention relates to systems and methods for estimating a diagnosis of a vehicle in need of repair or other servicing (hereinafter individually or collectively "repair") in advance of performing any diagnostic tests on or physical evaluation of the vehicle. The invention further estimates the costs for a repair to a vehicle in need of servicing in advance of performing any diagnostic tests on or physical evaluation of to the vehicle. The system is particularly useful at a point-of-sale (POS) system in a vehicle service center (VSC).

The system includes a database and service logic in communication with at least one and preferably multiple user interfaces. The database includes a memory that stores (i) customer information data, (ii) vehicle data including, vehicle type, vehicle areas of each vehicle type that can be potentially subject areas requiring repair, symptoms of malperformance to the respective areas, and historical repair data for respective the symptoms of vehicles serviced at one or more the VSCs, and (iii) repair cost data. The historical data may include data from a single location service center or, more preferably, includes collective data from multiple service centers whose data, at least with respect to historical repair data for repairing the area to resolve the symptoms relative to like vehicle types. The historical repair data is collectively accessible by each of the respective VSCs over a telecommunications network. The term "issue" as used herein is defined as a symptom in relation to an area of a vehicle.

The service logic is coupled to the database and adapted to calculate a pre-diagnostic confidence level of various potential repairs for the customer's vehicle based on historical repairs for like symptoms to the area of the same type of vehicle stored in the historical data. The confidence level for each potential repair is calculated as the total number of vehicles in the database corresponding to the customer's vehicle type that have historically have a specified repair for a customer specified vehicle issue divided by the total number of vehicles in the database of the customer's vehicle type that have been repaired for the customer specified vehicle issue. The service logic also ranks the various potential repairs in order of the calculated confidence level for each potential repair.

The processor logic also calculates an estimate of the repair cost for each ranked potential repair based on repair cost data. The repair cost data includes data that may be located solely in the stored data of the database or may include a combination of data from the database as well as local repair cost data from the VSC or other sources to estimate both time cost and as well as part costs for the potential repair. Alternatively, all repair cost data may be calculated from data obtained at the VSC.

In accord with a preferred aspect of the invention, the query to the data system is performed at a user interface. The interface can include a graphical user interface (GUI) that is configured to interact with the database data to carry out the one or more queries associated with this system processes. The system preferably comprises multiple user interfaces located at multiple vehicle service centers (VSC) that can communicate with the data storage and processing centers over a telecommunications network. In accord with another aspect of the invention, at least some of the user interfaces are in the form of the point-of-sale (POS) systems located at one or more VSCs. While the user interface is preferably in the form of a relatively stationary POS system located at a VSC, the POS system may comprise a terminal or a mobile computing devices including notebook computers, tablets, and/or telephones capable of having a suitable user interface and accessing the data storage and processing system over a telecommunications network, such as the Internet or a virtual private network (VPN).

The GUI includes a system for data input as well as information display. The GUI allows input or selection of customer information and customer vehicle information. The GUI also allows input or selection of one or more of pre-defined vehicle types, vehicle issues, and ranked potential repair (or potential repair otherwise indicated to have a relative confidence level to other potential repairs), once calculated by the system. The input or selection means includes a physical or virtual keyboard, a mouse, a trackpad, a trackball or other input or selection means commonly used in association with a menu or display system.

In addition, in accord with another aspect of the system which can be used in conjunction with the above described system, the system may be accessible by a customer, potential customer or other inquirer (hereinafter a 'customer') from a non-POS system located outside the VSC, that may be of like form to the POS system; e.g., a terminal or a mobile computing devices including notebook computers, tablets, and/or telephones capable of having a suitable user interface and network access to the database and service logic over a telecommunications network, such as the Internet or a virtual private network (VPN), that may provide the user with some or all of the functionality discussed above; i.e., a pre-evaluation estimation of the issue and potentially required repairs for a vehicle, preferably including a confidence level of such potentially required repairs. After appropriate user input (in accord with the above), the system ranks potential repairs prior to evaluation of the customer's vehicle, as well as optionally presents an estimation of cost for the ranked potential repairs. The system can direct the customer to a nearest or suitable VSC for vehicle repair. Such system may include a process to locate the customer by geolocating the customer's non-POS system or by customer input and lookup of location relevant data, such as reference to a customer input zip code for a VSC nearest to where the customer has requested servicing, identifying for the customer one or more closest VSC having access to the system, and provides logic, data structure, and an interface for making an appointment for the customer at a selected one of the VSCs to have the customer's vehicle repaired at an appointed date and/or time.

Once any customer's vehicle is eventually serviced, the historical data is updated to update the repair data for the potential issues for the customer's vehicle type so that such data is available upon subsequent query.

BRIEF DESCRIPTION OF THE DRAWINGS

FIGS. 4A-4F are screen images of an exemplar graphical user interface (GUI) for a point of sale (POS) terminal of the system for carrying out a portion of the method described in FIG. 3.

DETAILED DESCRIPTION OF THE PREFERRED EMBODIMENTS

Reference will now be made to the following detailed description of the preferred and alternate embodiments of the present invention. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

For purposes of understanding the context and scope of the system and method, a repair, as defined herein, includes any repair or service that may be necessary or preferable to bring a vehicle into optimum (or at least acceptable) operating condition. Repair may include the replacement or modification of parts that have ceased to function in accord with their original specification and/or any service to a vehicle. Service may include, without limitation, mechanical, electric, or electronic reset of components or systems, replacement or replenishment of operating fluids and filters, cleaning of various components and systems, providing appropriate operator advisement on the operation of the vehicle to overcome a vehicle issue perceived by the operator. Other conditions requiring repair are possible and are within the scope of the invention.

Figure 1:
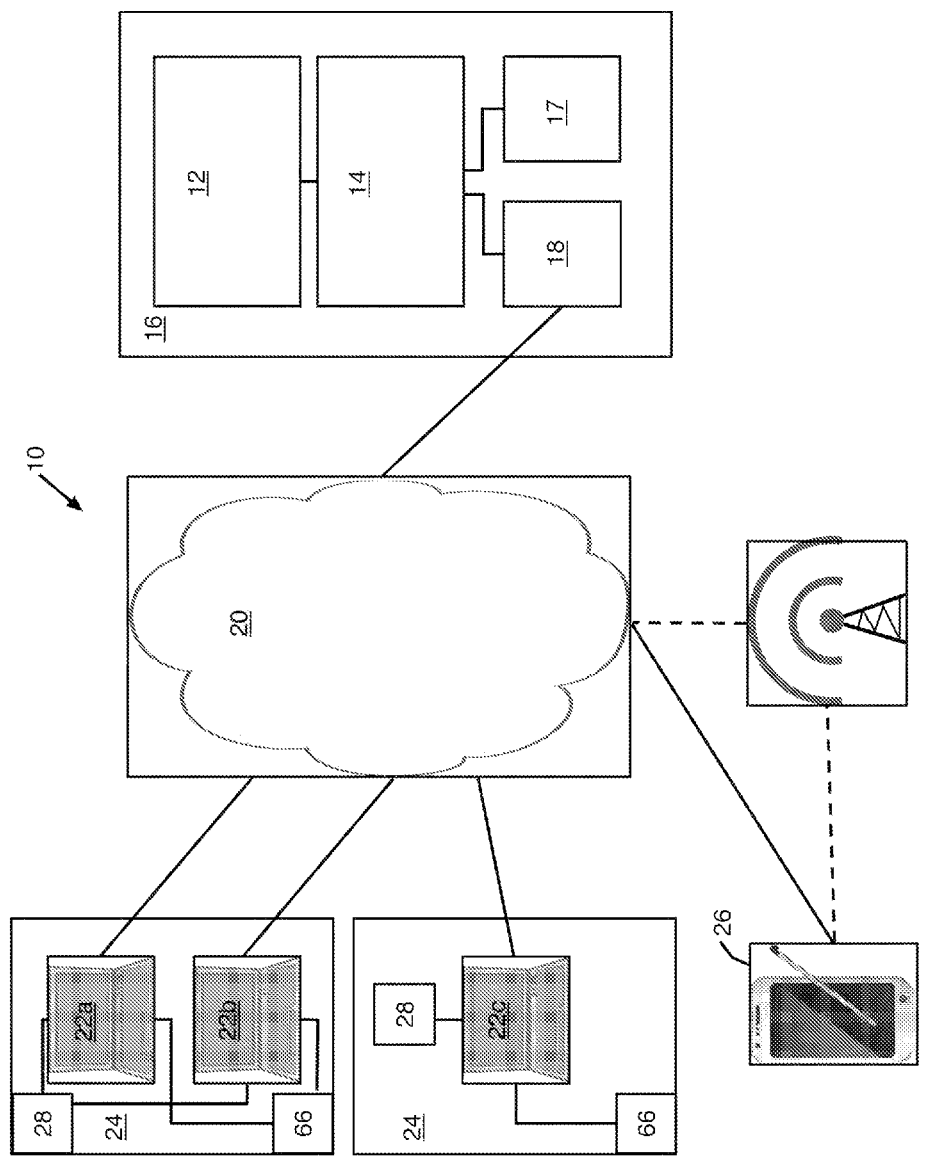
FIG. 1 is a schematic diagram of the system of the invention.

FIG. 1 is a schematic perspective view of a vehicle pre-diagnostic repair estimation system 10 in accordance with the invention, for use in carrying out the method of the invention. The system 10 includes a database 12, represented more specifically at FIG. 2 and discussed below, and service logic 14 is coupled to the database for carrying out logic based operations on data in the database 12. The database 12 may be any singular data store or multiple data stores that together store the requisite data, described below. The database 12 and service logic 14 are each provided for access and processing as a cloud service 16. An application programming interface (API) 17 is provided for interaction with the database 12 and service logic 14. A bridge 18 couples the service logic 14 to a telecommunications network 20. The telecommunications network 20 is preferably an IP packet-switched network such as the Internet, but can be private network such as a virtual private network (VPN). A plurality of point of service (or point of sale) (POS) terminals 22a, 22b, 22c (generally 22) are coupled to the network 20 through the bridge 18.

More specifically, the bridge 18 provides an interface for secure communication between one or more POS terminals 22 and the one or more datacenters that constitute the database 12 and the logic service 14, to thereby enable the one or more vehicle service centers (VSC) 24 to participate in the pre-evaluative repair type and cost estimation, and to update data in the database 12.

The POS terminal 22 can be realized by a networked computer (such as a personal computer, laptop, netbook, tablet, workstation, server, PDA, smartphone or other computing device) with a web browser or other suitable software for interacting with the cloud service utilizing networked communication. Each POS terminal 22 includes a graphical user interface (GUI) for data input into the database 12 as well as display of information retrieved from the database, such as on a monitor or via a printer device. The GUI allows input or selection of customer information and customer vehicle information. The input or selection means includes a physical or virtual keyboard, a mouse, a trackpad, a trackball or other input or selection means commonly used in association with a menu or display system. Each of the POS terminals 22 is located in a vehicle service center (VSC) 24. The POS terminals are specifically adapted by at least software to transact with a customer for purposes of completing a sale of services by the VSC, preferably also receiving/inputting customer information by a non-technician (described below) employed by the VSC, as received from the customer, as well as carrying out other functions necessary or advantageous to the system described herein.

A VSC 24 is a location adapted for on-site vehicle repair. The VSC 24 generally operates with one or more experienced automotive vehicle technicians capable of diagnosing and repairing a vehicle, and preferably one or more non-technician (non-technical employees to the extent that each is not tasked with diagnosing and/or repairing vehicles) who are tasked with interfacing with customers, transacting initial service requests for the vehicles, and transacting payment for service after repair on a vehicle has been effected. Optionally, multiple POS terminals 22 may be provided in a single VSC 24, and most preferably, multiple VSCs 24 are coupled to the network, with each VSC 24 interfacing over the cloud service 16 with the same database 12.

As indicated, the cloud service 16 includes a database 12 that stores electronic information (referred to herein as a "data") related to (i) customers, (ii) vehicles, and (iii) repair costs to repair vehicles. A cloud service application operating on a respective POS terminal 22 can cooperate with the cloud service 16 using networked communication to allow a user of the POS terminal 22 to query the cloud service 16 for data or to perform calculations based on data stored in the database 12, or to input data into the database via the cloud service. As an alternative to a cloud service 16, the logic service 14 and database 12 can be otherwise implemented over a wide area network in accord with any presently known or future implemented systems and methods. Further, suitable software is preferably provided for locally interacting with local copies of databases similar to database 12 (discussed further below) and logic in the event there is temporarily no access to the cloud service (temporary Internet outage), or in the event a VSC cannot be set up with suitable access to the cloud service on a regular basis, e.g., the VSC does not have access to sufficient network bandwidth.

Figure 2:
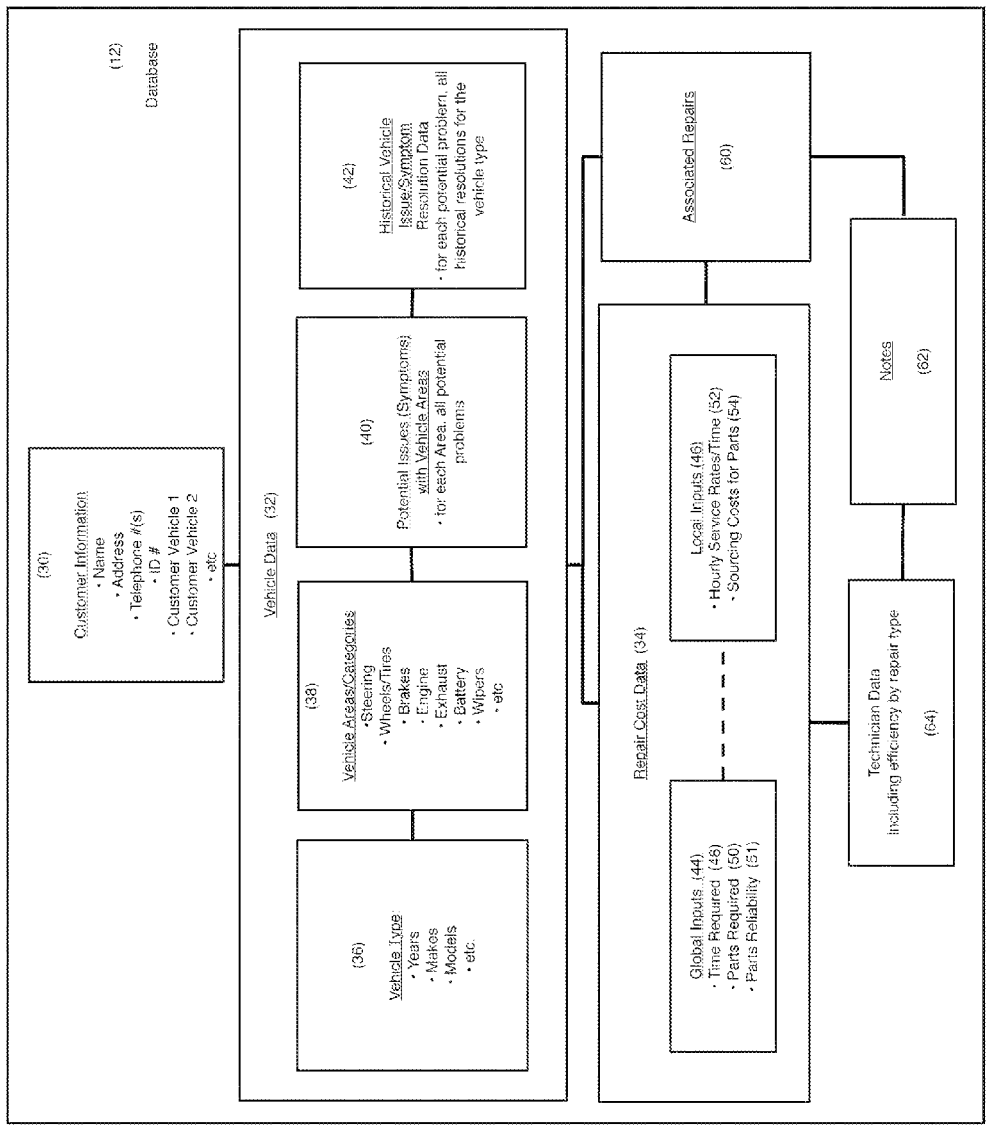
FIG. 2 is a schematic diagram of the database of the system.

More specifically, referring to FIG. 2, the database 12 includes customer data 30, vehicle data 32, and repair cost data 34. The customer data 30 includes, for each current customer of a VSC 24 connected to the network 20, the customer name, address, contact telephone number(s), optionally other identifying information (including, but not limited to, customer ID for the VSC, customer email addresses, etc.), as well as identification of the vehicles owned/leased by the customer. The vehicles owned/leased by the customer are identified by year, make, model and any other relevant identifying features such as license plate and/or vehicle identification number (VIN), as well as a history of repairs performed to the vehicle at a VSC within the network of VSCs. In addition, the mileage of the vehicle upon the prior repair service may be recorded with the vehicle data. However, it is not necessary to store such current customer information in the database 12 of the cloud service 16. Rather, it may be stored in a database local to each VSC 24, with such valuable customer data 30 maintained and retained locally without identifying such information to other VSCs.

Vehicle data 32 includes the categories of:
vehicle type 36;
areas 38 of a type of vehicle;
symptoms 40; i.e., malperformance issues linked to an area on a vehicle; and
historical resolutions 42 to a reported symptom with an area on a vehicle.

Vehicle type 36 includes years, makes, models, and optionally any other vehicle feature set that may be shared by a group of vehicles and further optionally any relevant information, all of which may be valuable for identifying a customer vehicle with vehicle types that have previously been evaluated by all of the VSCs networked with the system.

Areas 38 of a vehicle type include general locations (front, rear, passenger side, driver side), dashboard, systems, and components, etc. of a vehicle that are locations at which the customer or other non-technician can readily identify same aspect of non-optimal or malperformance of the vehicle. With respect to a location, it can be the general or specific point of perceived origin of an unusual noise from the vehicle (where the customer hears a whirring noise, a whistling sound, a grinding noise, a scraping noise, a rumbling noise, etc. upon some occurrence or at all times), the location of a warning light (such as at the dashboard), or other indicia of problem indicating repair or servicing is required. Such areas can also specifically identify major vehicular systems, including the engine, the transmission, the exhaust, etc. The areas also include more localized systems such as brakes which can be further localized to the front and back and left and right, as well as the brake pedal. The areas further include components such as front or rear windshield. Another area can be the ignition. It is also appreciated that not all vehicle types have the same areas. A pickup truck will have a bed; a passenger vehicle will not. Vehicles with dual exhaust may have an exhaust left and an exhaust right; others will have a single exhaust. Particular vehicles may have wiper blades over the headlights; most other do not. Therefore, while it is appreciated that identified vehicle areas will be common to most vehicle types, there may be vehicle areas that are specific to a limited group of vehicle types or one vehicle type. The important characteristic of an 'area' is that it indicates a location on a vehicle that can be identified by a non-technical individual and is perceived to be associated with the potential issue. The area can be general, specific, or identified by a combination of general and specific locations, components or systems.

Symptoms 40 for each of the areas in the data category of areas 38 (i.e., together "issues") that have been shown to require repair (including replacement and/or servicing) are also identified and stored. By way of example, for either the areas of the dashboard or the engine, the 'check engine light' may be indicated, as the light will be indicated on the dashboard but indicates a problem with the engine; similarly with the 'oil pressure gauge'. By way of another example, for the brakes, the customer may indicate that a noise is heard at the front left wheel when stepping on the brake, or that the vehicle is too slow to stop when stepping on the brake, or that the brake peddle pushes too far down toward the floorboard. In yet another example, the customer may indicate that the car does not consistently start when turning the key in the ignition, or that the car does not start and he hears a clicking sound.

For each of the vehicle data 32 categories of vehicle type 36, areas 38, and symptoms 40, it is important that the categories be organized in the database in a manner that would allow a non-technician to sort through the categories to identify for the customer: (i) his/her vehicle, (ii) the area requiring repair, and (iii) the symptom with the area (i.e., the issue) that caused the customer to identify his/her vehicle as necessitating repair. In accord with a preferred aspect of the invention, the GUI of the POS terminal 22 is preferably configured as a hierarchical menu system to facilitate such identification. As described in more detail below, a set of menus are presented that allows a non-technician to initially and rapidly select the vehicle corresponding to the customer's vehicle. Menus are provided with each of the vehicle makes to cover all (or substantially all) of the vehicles of the intended customer base, as well as a reasonable range of years (corresponding to the year of vehicle production) of such makes of vehicles from which to select. Once the make and year is selected, a menu of the appropriate models of vehicles for that year is presented, as well as any other menu to permit selection of the appropriate vehicle (all corresponding to the data category of 'vehicle type' 36). It is appreciated that the menu system can be presented in a different order (e.g., make, model and then year) and any order that facilitates (preferably rapid) selection of the appropriate vehicle is within the scope of the invention. Once the vehicle is selected, an appropriate menu system is provided to assist the non-technician to identify the problem areas within the vehicle (corresponding to the data category of 'areas' 38). Similarly, once the problem area is selected, an appropriate menu system is provided to assist the non-technician to identify the symptom associated with the indicated problem area; i.e., perceived issue (corresponding to the data category of 'symptoms' 40). It is appreciated that any menu system or other manner of organizing and presenting such data to the non-technician is within the scope of the invention, provided that it allows the non-technician to select an issue with an area of a vehicle that is believed by the customer as requiring some servicing. As an alternative to a structured menu system, a natural language searching system using an artificial intelligence system that parses the symptomatic issue in relation to the vehicle area from the input natural language is also within the scope of the invention. Such a natural language searching system may be based on input written text and/or spoken words. For purposes herein, where a menu system is generally referenced, it includes such a natural language searching system.

The historical resolutions data 42 includes a data record corresponding to the repairs associated with all reported symptoms for each area of each vehicle type (make, model, year, etc.). Such resolution is referred to as a historical fix, a historical repair, or a historical resolution, each having the same meaning.

The service logic 14 is configured to perform several calculations with respect to the data in the database 12. First, as the categorized vehicle data 36 is traversed via the menu system to identify a vehicle matching the customer's vehicle (same make, model, year, etc.), with each selection of criteria (make, model, year, etc.) for the customer's vehicle, the service logic maintains a running count of all vehicles having historical resolution data 42 indicating that they have ever been serviced by the network of VSCs and which match the selected vehicle type. Thus, at any time, such running count can be called and output to the GUI of the POS terminal 22, as further discussed below. Then, the area data 38 menu system is traversed with respect to the customer's vehicle to identify the associated problem area, with the service logic 14 identifying a count of all vehicles in the historical resolution data 42 that have had service on such problem area. Then, the symptom data 40 menu system is traversed with respect to the customer's vehicle to identify the appropriate issue with the vehicle, with the service logic identifying a count of all vehicles in the historical resolution data 42 that have had service to repair such issue on the identified area of such type of vehicle.

Assuming different repairs have been performed on the vehicle type to correct the identified issue, the logic service 14 calculates for each such different repair a confidence level as to whether it is the appropriate repair for the vehicle type and for the customer's identified issue. The confidence level is calculated using the historical data, using the same vehicle type as the customer's vehicle and the issue identified with respect to the customer's vehicle:

$$\frac{\text{vehicle count of vehicles requiring a distinct type of repair to resolve the issue}}{\text{vehicle count of all vehicles repaired for the same issue}}.$$

The confidence level can be calculated for each different repair that has historically been performed given the same vehicle type and the same issue. If the issue is historically associated with one and only one repair type, then the confidence level will be 1, or 100 percent. If the issue has been associated with different repairs, the confidence levels for all potential repairs is calculated, with the summation of the all of the confidence levels (in terms of percent) summing to 1 (or approximately thereof where rounding is performed). With the confidence level of each of the potential repairs calculated, the potential repairs are preferably ranked in order of their respective confidence levels, with the first ranking having the highest confidence level and the last ranking having the lowest confidence level. It is recognized that a larger number of matching vehicles (which requires both vehicle type and same issue) will indicate greater validity to the confidence level, and thus in the ability to predict the required repair based on the calculated confidence level prior to having the vehicle evaluated by a technician. While a confidence level may be calculated for each different repair, it is appreciated that such a confidence may only be calculated for the repairs until the summation of confidence levels add up to 0.8 or 80%, so as to eliminate calculation of confidence level for repairs which are too few in number to be significant. In addition, it is also appreciated that the confidence levels can be calculated for only a select number of potential repairs for a given issue, e.g., up to a maximum of five different potential repairs, regardless of the collective summation of the confidence levels thereof.

It is also recognized that other factors, variables, and/or weightings can be considered in calculating the confidence level. By way of example, it is appreciated that the current mileage of the customer vehicle may be a weighting factor such as to affect the confidence level and ranking of the potential repairs. As another factor, prior repair history of the customer vehicle can also operate to affect confidence level and ranking. As yet another factor, location of the customer vehicle (based on, e.g., zip code) can be used as a weighting factor such as to affect the confidence level and ranking of potential repairs. This is potentially important where weather or geography can be a factor in the cause of an issue and be a signal of a potential repair. Other confidence levels or metrics, including rankings, associated with a confidence level can be calculated as well.

The confidence levels and rankings are communicated from the logic service 14 to the bridge 18 and through the network 20 to the POS terminal 22. Thus, the non-technician is able to rapidly provide the customer, potentially in under one minute, an estimate of one or more potential repairs that could be required, each with an indicated confidence level, prior to any experienced technician connecting a diagnostic code reader to the vehicle's computer and analyzing the received diagnostic codes, or placing the vehicle on a lift and physically examining the vehicle, or taking the vehicle for a test drive, etc.

In addition to the potential repairs indicated in responses to the input symptoms of the issues under the confidence levels, the database stores data 60 indicating whether additional problems have been historically associated in time and relation to the issue and their potential repairs. The data can be mined to identify whether additional repairs should be considered in association for certain symptoms, even if such repairs are not specifically indicated to repair the issue associated with the potential repair designated by a confidence level. In this manner, the customer can be apprised of future issues that may not be currently apparent, but which are likely to occur and should potentially be corrected during the present repair visit at the VSC to prevent the vehicle from having a repeat visit to the VSC in the near term.

Once the potential repairs are identified, the non-technician can obtain an estimate for the costs to repair the vehicle. Generally, it is anticipated that the potential repair having the highest confidence level will be selected for cost estimation. However, any one or more of the potential repairs can be selected for cost estimation, or all cost estimates can be prepared and presented on the POS terminal at once, as shown and described with respect to FIG. 4F, discussed below. For each potential repair, the repair cost data 34 preferably includes global inputs 44 and local input 46. Global inputs 44 include an estimate of labor time 48 to perform each of numerous standard repairs and the parts list 50 to perform the repairs. Local inputs 46 include hourly labor rates 52 for repair at a particular VSC and the cost 54 to source the parts to perform the repairs.

More specifically, the repair cost data 34 can include costs for parts of different 'quality'. The term 'quality' is not limited to characteristics that affect the useful life or performance of a part, component or system, but can also mean, by way of example only, whether a part is original equipment manufactured (OEM)(generally most expensive), an aftermarket replacement part, or a reconditioned used part (generally least expensive, but potentially of limited availability), all of which may be suitable for the repair and can have suitable useful life or performance for the repair. All such parts can be stored in the database. The system can provide options to the customer and/or allow the customer to specify that a repair is only to be made with OEM parts, or that a repair is to be made in the least costly manner possible.

In addition, the system can store in the database 12 and mine whether repair parts from a source (brand and/or vendor) have relatively higher or lower reliability than parts from a different source; i.e., a reliability rating. When vehicles are brought into the VSC for repair, the source of the replaced parts and preferably the age of the replaced parts are stored at 51 in the database to determine part reliability. Then, when a customer brings a vehicle into the VSC, the system can identify and optionally automatically select sources of parts which have historically had a higher reliability rating, and/or exclude sources of parts which have historically had a lower reliability rating. In addition, the source of the selected parts used in the repair are also stored to ascertained their reliability or lack thereof. Thus, it is appreciated, that source data for parts of the replaced component as well as the parts used in the repair of the replaced components is collected, stored and accessible by the system to individually and collectively provide repaired vehicles with greater reliability. The reliability data is dynamically updated, with the ratings having increase validity, as the system has greater use over greater time, with more information provided to the reliability database 51 in the system to be mined for such purposes.

The sourcing costs 54 may account for different costs for some or certain parts when ordered by different VSCs 24. This may be due to different costs in different geographical or regional locations, and also dependent upon the cost to transport the parts to the VSC, taxes, local inventories, etc., and the sourcing costs 54 in the database may be provided with and regularly updated to have a sufficiently current store of costs for the parts.

Also, the system may be configured to apply hourly labor rates 52 dependent upon the origination of the query from the POS terminal 22 at the VSC 24. The local hourly labor rate may be designated on a per VSC basis, on a group of VSCs (i.e., those under common management or ownership), on a regional basis (i.e., a rate for VSC located in the Midwestern States, the South, the Mid-Atlantic States, New England States, Southwestern States, etc.), by zip code, by area code, or in any other manner of applying rates that operates to the benefit of the VSCs in the system or the overall management of the system. Alternatively, a single hourly rate may be applied globally by the system. Suitable database structure and links are provided for the respective arrangements of the global input data and local input data relative to the system.

The local inputs 46 may be the same at each VSC; i.e., there may be a common hourly rate across the system and the cost to source parts may be consistent at all VSCs in the system. The local input 46 may be stored at the database 12, may be stored in separate databases, at a database storage device local to a VSC, or provided from third party linked databases (such as those maintained by a supplier for cost data 54). In one embodiment, it is contemplated that each VSC stores a local database 28 that is linked to the service logic 14 responsible for calculating an estimate of the repair costs. In addition, as an alternative to the database 12 containing and determining the best source to obtain parts for a repair, the local database 28 may locally store the costs locally or nationally sourced parts and preferred sources for sourcing, and/or is in network communication to one or more parts sources to obtaining real-time data on parts inventory and pricing. The local database 28 may be coupled to the POS terminals 22 as fixed or removable non-transitory computer-readable storage media, such as magnetic computer disks, CD-ROM, DVD-ROM, or other suitable computer-readable and/or re-writable storage media to receive output from and provide input to one or more POS terminals 22, and may be attached to a local or wide area network server servicing multiple POS terminals in one or more VSCs.

Once the time required and hourly rate are known (from the inputs 48 and 52), the labor costs can be calculated as the product thereof. Once the parts required and the sourcing costs are known (from inputs 50 and 54), the total parts costs can be calculated as the summation of the total costs for the respective parts. The repair can then be estimated as the summation of the labor costs and parts costs.

In addition, notes 62 can be stored, called and advanced to the POS terminal 22 that are linked to the customer vehicle (including, but not limited to, prior repair history of the vehicle, either in general or as directed to the area or symptoms), service bulletins related to the vehicle in general or as directed to the area or symptoms, or recall notices related to the vehicle in general or as directed to the area or symptoms. Such notes and services bulletins may also include geographic tags which link information related to local service issues in general or as directed to the area or symptom specifically. By way of example, e.g., rust of certain fluid lines resulting from proximity to salt water for vehicles located in an ocean coastal region.

An identification of the potential repairs leading to resolution of the symptoms, ranked in order, as well as the estimate for repair of the one or more selected issues, as well as any indicated notes can be provided to the customer, e.g., via print-out, email or other transfer. It is anticipated that providing the customer with the initial pre-evaluation estimate of both the potential repair(s) required, as well as an estimate of the respective costs for repair of such potential repair(s) will remove an uncertainty from the customer that may otherwise prevent the customer from leaving the vehicle to have repairs performed. That is, once the 'unknown' of not knowing what the potential vehicle problem could be and its associated cost to repair is eliminated, customers may be more likely to remain at the VSC for further vehicles evaluation. In addition, the information can be generated and provided to the customer very quickly.

Referring now to FIGS. 1 and 2, the system is also configured to order and generated a work order from the POS terminal 22, which can be sent to a technical terminal 66 to provide the customer information, vehicle type information, area of problem, symptoms and ranking of potential resolutions. In addition, the POS terminal 22 can designate in the work order a defined customer pick-up time for the vehicle, and any other relevant information.

In accord with another aspect of the system, the database includes technician data 64. The technician data 64 provides the data to calculate or a calculated efficiency level or score for preferably each service technician for each specific type of repair the technician performs. For purposes of the described system, "efficiency" is defined as ability to complete an indicated repair within a least amount of time. The calculated efficiency level can be stored, or it can be calculated as needed, such as when a work order calling for a repair of a certain type is required. The repair type can be independent of vehicle year, make or model (e.g., brake repairs, generally), or dependent on such factors as vehicle year, make, model, etc. (brake repairs, Mercedes, all S-class vehicles, years 2010-2013). Based on the calculated or stored efficiency level, the technician that is most efficient for the potential repair with the highest confidence level is assigned to the work order, assuming such technician is available. If the most efficient technician is not available, then the most efficient and available technician is assigned to perform the work under the work order. If after diagnostics are performed, it is determined that the required repair is one having associated with a lower confidence level, the technician may be maintained or it is possible to reassign the work to a new technician having a higher efficiency level for the diagnosed issue. The time to perform a repair is tracked and recorded by the system and associated with the technician performing the repair. Such tracking may be automatic, in which the technician indicates start and stop times of each repair, with the system calculating the time differential, or the technician may manually input the time he spent completing the repair.

Once the vehicle is assigned to the technician, evaluated and diagnosed, i.e., with the technician determining the actual problem and the actual resolution required, the repair is performed and the historical repair data 42 is updated. When the historical repair data is updated, the vehicle type data (make, model, year, etc.) 36, reported symptom 40, the specified area 38 of the vehicle, as well as the repair actually performed are written to the database in a correlated manner. Such historical repair data 42 is dynamic and automatically modified by the POS terminal 22 or technical terminal 66 as each repair to a vehicle is reported (or preferably automatically on another regular basis, such as nightly, weekly, monthly, etc.). It is also preferred that a copy of such regularly updated database is stored locally in the event the system is run in an offline mode; i.e., without communication through the cloud service. The updated historical repair data 42 is used to modify subsequently calculated confidence levels for the various potential repairs to a like vehicle type with a similarly reported issue. Thus, the accuracy of the confidence levels increases as more repair data is added to the database. This move toward higher accuracy all occurs automatically, in the background, with each repair. In addition, the historical data is linked to the customer's vehicle to facilitate generation of a vehicle repair history for all vehicles in the database 12. Additionally or alternatively, the historical repair data can be provided as or supplemented by third party data having historical repair data which is preferably provided with regular updates. Additionally or alternatively, the historical repair data can be output to a third party for use in a separate vehicle diagnostic solution. Similarly, relevant data regarding the parts replaced (by source and/or brand) and parts used in the repair (by source and/or brand) are written to the parts reliability database 51. Also, the technician database 64 is updated to record the time required for the technician to complete the repair. The POS terminal 22 is configured to perform invoicing for the work that is to be performed (e.g., including deposits or initial diagnostic fees) or work that was performed, interface with payment systems including credit card charge systems, and provide receipt for payment received, all in accord with known POS terminal operations.

Referring to FIG. 1, in accord with another aspect of the system 10, which is intended to be used in association with the above described aspects of the system, the system is accessible by a non-technician offsite of a VSC. It is contemplated that the offsite non-technician is a customer, potential customer, other vehicle owner or inquirer, or any other person or system accessing the database offsite from the VSC (hereinafter a 'customer'). In most circumstances where the customer, as defined, is a non-employee, it is intended that the customer will have access to a limited portion of the database 12 and logic service 14 relative to that accessible at a POS terminal 22 via a non-POS terminal 26. However, it is possible that the offsite access may be made by an employee and that full access to the system previously disclosed will be enabled, e.g., via secure or non-secure log-in.

The non-POS terminal 26 includes any other terminal or mobile computing device including a notebook computer, a tablet, and/or mobile telephone capable of having a suitable user interface to interface a portion of the system logic 14 to query a portion of the database 12 over the telecommunications network 20, such as the Internet or a virtual private network (VPN). The limited portion of the database allows the terminal 26 to conduct queries to calculate a pre-evaluation estimation of the problems and potentially required repairs for a customer's vehicle, preferably including confidence levels of such potentially required repairs, and a ranking of the potential repairs in order of the calculated confidence levels, all in accord with the above. In addition, the system optionally may provide an estimation of cost one or more of the ranked potential repairs, all in accord with the above. Then, the system can direct the customer to a nearest or suitable VSC for vehicle repair. In order to so direct the customer, the system includes or accesses a process to geo-locate the customer's non-POS terminal 26 or by customer input and lookup of location relevant data, such as reference to a customer input zip code for a VSC 24 nearest to where the customer has requested servicing. Further, the location of the customer, allows presentation of regional notes and/or optional weighted calculation of the confidence levels in view of issues relevant to the customer's location. The system is then able to identify for the customer one or more closest VSCs 24 having network access to the system. The system preferably allows the customer to input and/or indicates to the customer the radial distance or travel distance about the customer at which the VSCs are identified, e.g., 10 miles, 25 miles, 50 miles. This can be performed in conjunction with geo-location of the VSCs 24 and available mapping APIs. The system also includes suitable logic and database structure capable of making an appointment for the customer at a selected one of the VSCs 24 to have the customer's vehicle repaired at an appointed date and/or time.

While the system has been primarily described with respect to a system having multiple VSCs 24, it is appreciated that it can be implemented in a system with a single VSC, and the POS terminals 22 in the VSC may include one or more local processors and associated local memory (LAN-side) to execute instructions and manipulate information (logic services) according to the operations described herein for pre-evaluative vehicle diagnostic estimation and repair cost estimation in accord with the system, thereby eliminating the WAN network operations.

Figure 3:
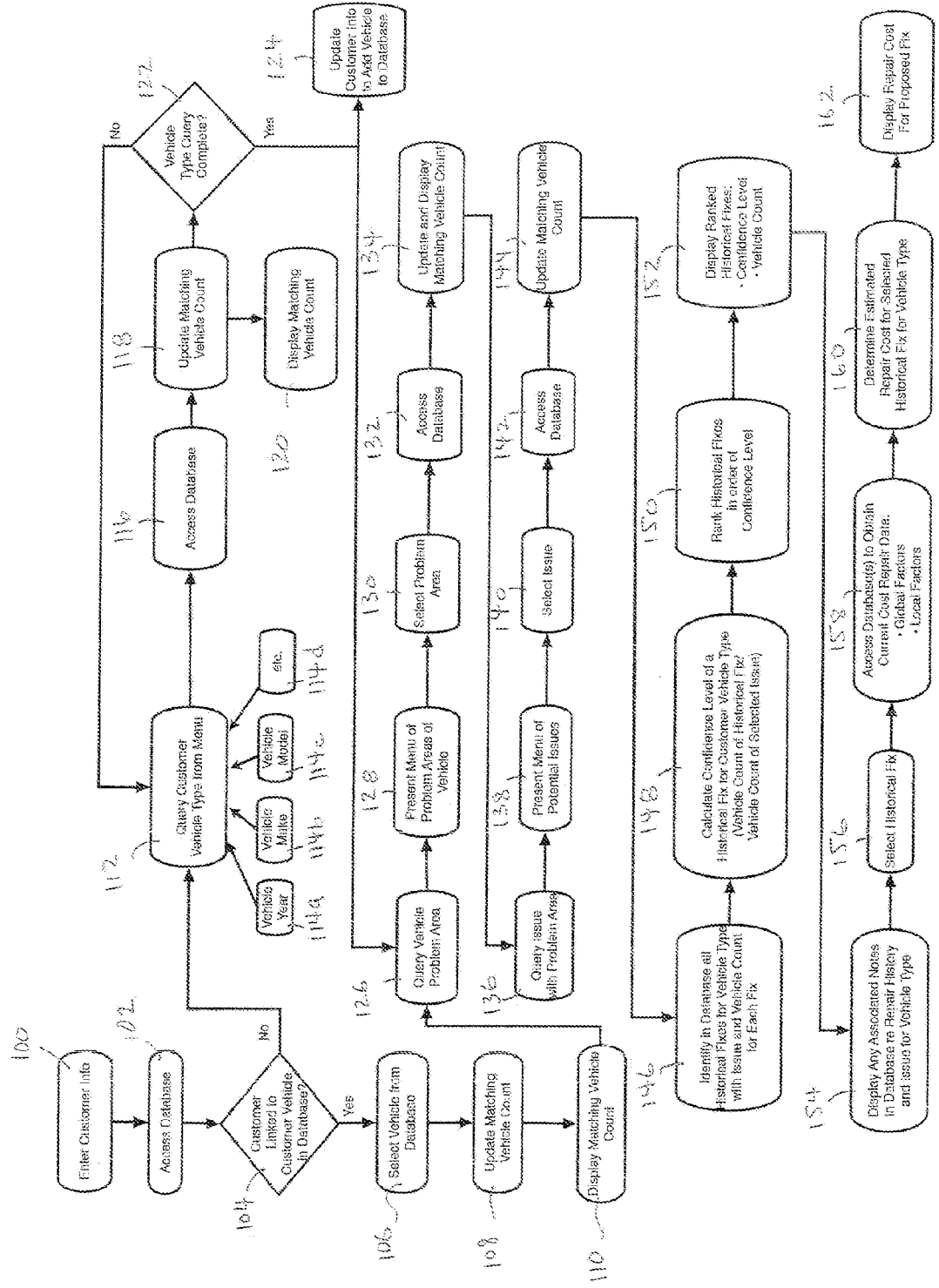
FIG. 3 is a flowchart illustrating one portion of a method according to the system.

A method of using the system of the invention is now described in association with the flowchart of FIG. 3 and an embodiment of a GUI for a POS terminal 22, at least partially illustrated in FIGS. 4A through 4F. A customer brings a vehicle for repair to the VSC 24 and approaches the POS terminal 22. The employee, generally a non-technician at the VSC, enters identifying information for the customer into the POS terminal at step 100 as partially shown at a screen 200 of the GUI. If the customer is a prior customer of the VSC (or another VSC linked to the VSC at which the customer is located, such as by co-ownership or franchise), sufficient information is entered to select the customer's existing record in the database. As the customer information is entered or once it is entered and the NEXT button is selected at step 102, the database is queried for matching records and, assuming the customer is an existing customer, the matching database record linked to or containing the customer's information is selected. If the customer is a new customer, a new database record is created for the customer.

Referring to FIG. 4B, assuming the customer is a prior customer, preferably at least a portion of the personal information, e.g., contact information, linked to the customer in the database is displayed at 202 on the GUI. The employee is provided with the option at 204 to update the information, if necessary. In addition, it is determined whether the customer is already linked to any vehicles at step 104 and, if so, the one or more vehicles linked to the customer are displayed on the GUI at 206. If the vehicle requiring repair is one of vehicles displayed at step 104, the vehicle can be selected at step 106.

When the vehicle is selected at step 106, the system then determines how many other of the same type of vehicle as the selected vehicle (same year, make, model, and optionally, same engine, and optionally same transmission), are in the database at step 108. This vehicle count is preferably displayed on the GUI at step 110 to the employee to provide an indication of the how many like vehicle are in the database.

If the vehicle is not linked with the customer in the database, the vehicle must first be added to the customer record 30 in the database (FIG. 2). A new vehicle can be added starting with the selection of ADD NEW VEHICLE button 208, and now in reference to steps 112 through 124 in FIG. 3 and FIG. 4C. The employee queries the customer at step 112 to identify the characteristics of the customer's vehicle. For example, at least the YEAR at step 114a, MAKE at step 114b, and MODEL at step 114c are queried, and the GUI provides a menu system to facilitate such query and selection, shown at 210 (YEAR), 212 (MAKE), and 214 (MODEL). Preferably, though optionally, the ENGINE type can be queried at step 114d and entered or selected from the menu system, at step 216. Yet another preferred, though optional query, includes the TRANSMISSION type, also generally indicated at step 114d, and shown on menu at 218 which can be entered or selected. Other options can be queried and entered or selected from preferably predefined selections. While the order of query for the YEAR, MAKE and MODEL can be modified, after the selection of each, it is preferred that the system access the database at step 116, and update the vehicle count at step 118 for the vehicles that match the presently selected vehicle type characteristics (YEAR, MAKE, MODEL, ENGINE, TRANSMISSION, etc.), and that the vehicle count be displayed at step 120 on the GUI, as shown at 220.

It is preferred that the only options available for query and selections are those that meet the criteria of all other characteristics of the vehicle type already selected. That is, by way of example, once the YEAR, MAKE and MODEL are selected, are engine types for the vehicles types having the other matching characteristics are available for selection.

Once all the vehicle type characteristics have been selected at step 122, the vehicle is linked to the customer's record in the database at step 124, e.g., by selecting a NEXT or ENTER button 222.

Figure 4A:
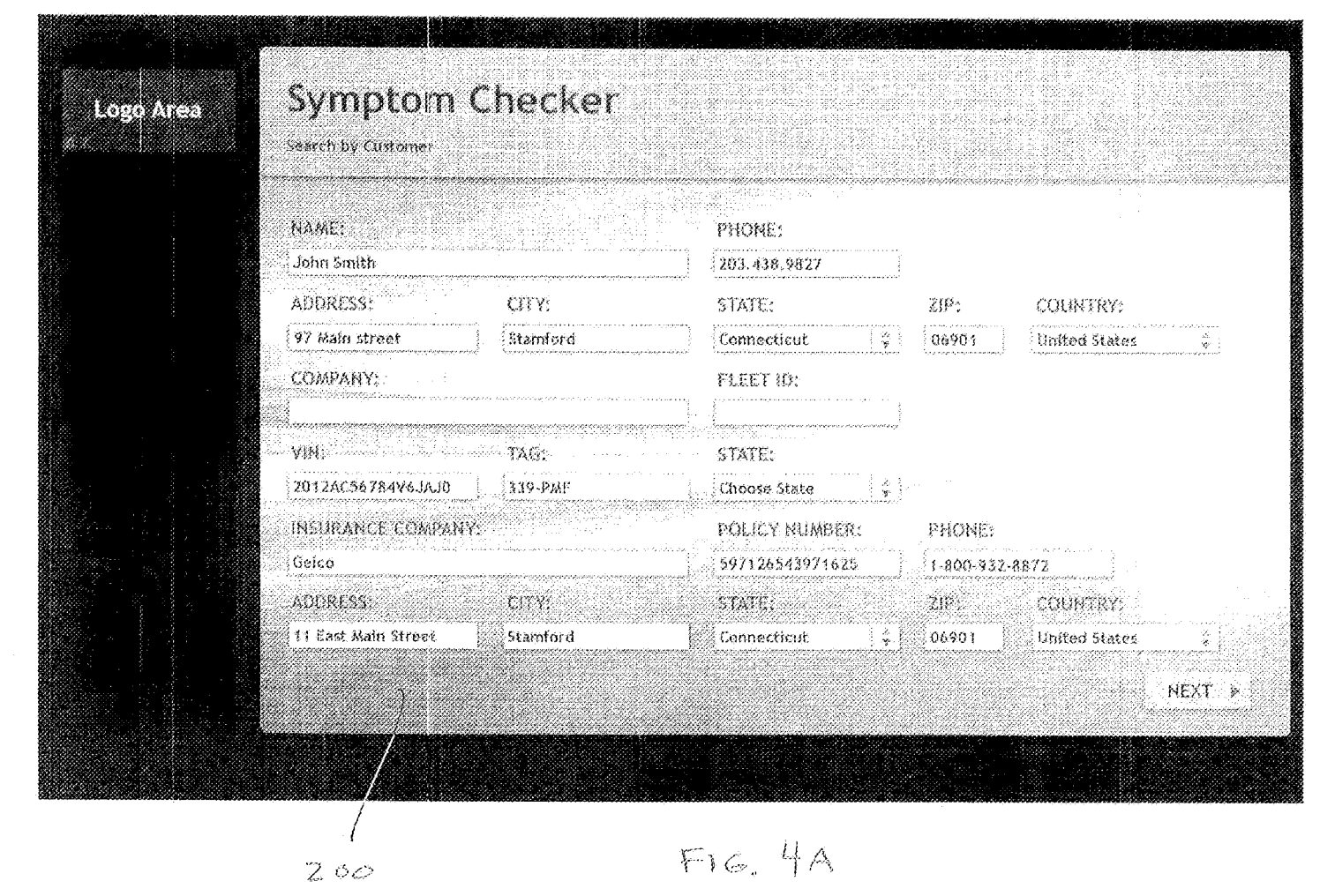
Figure 4C:
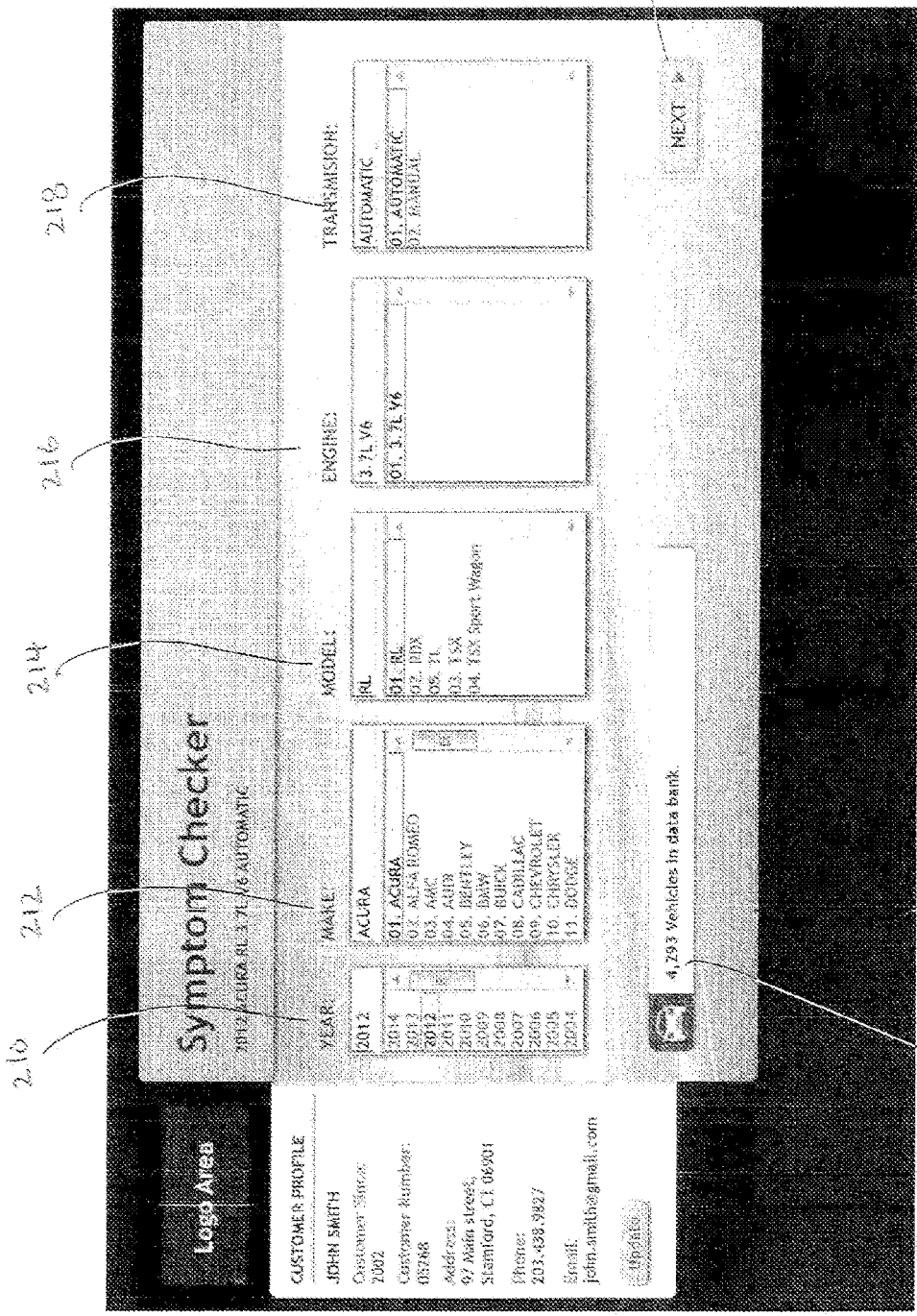
Figure 4D:
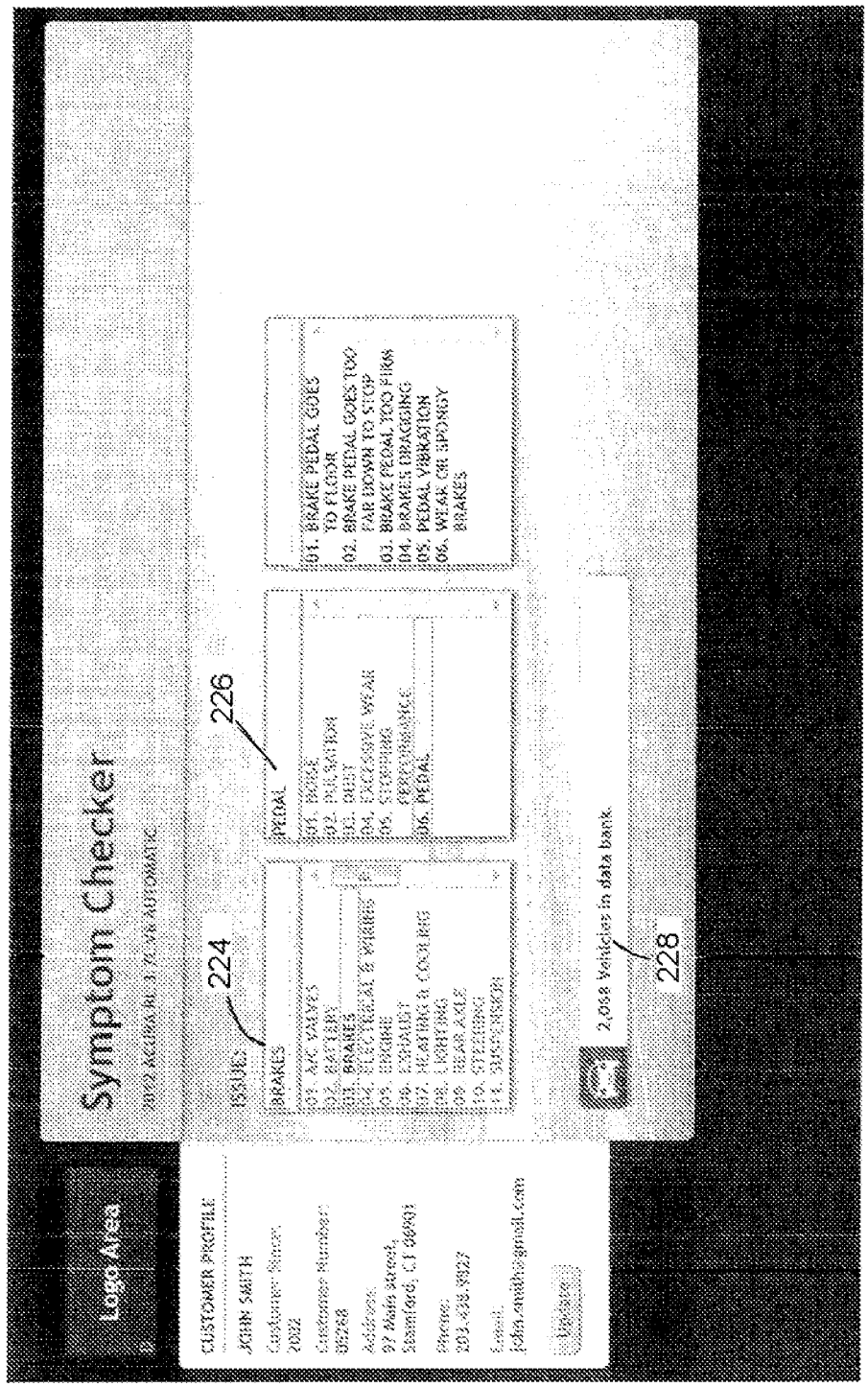
Figure 4E:
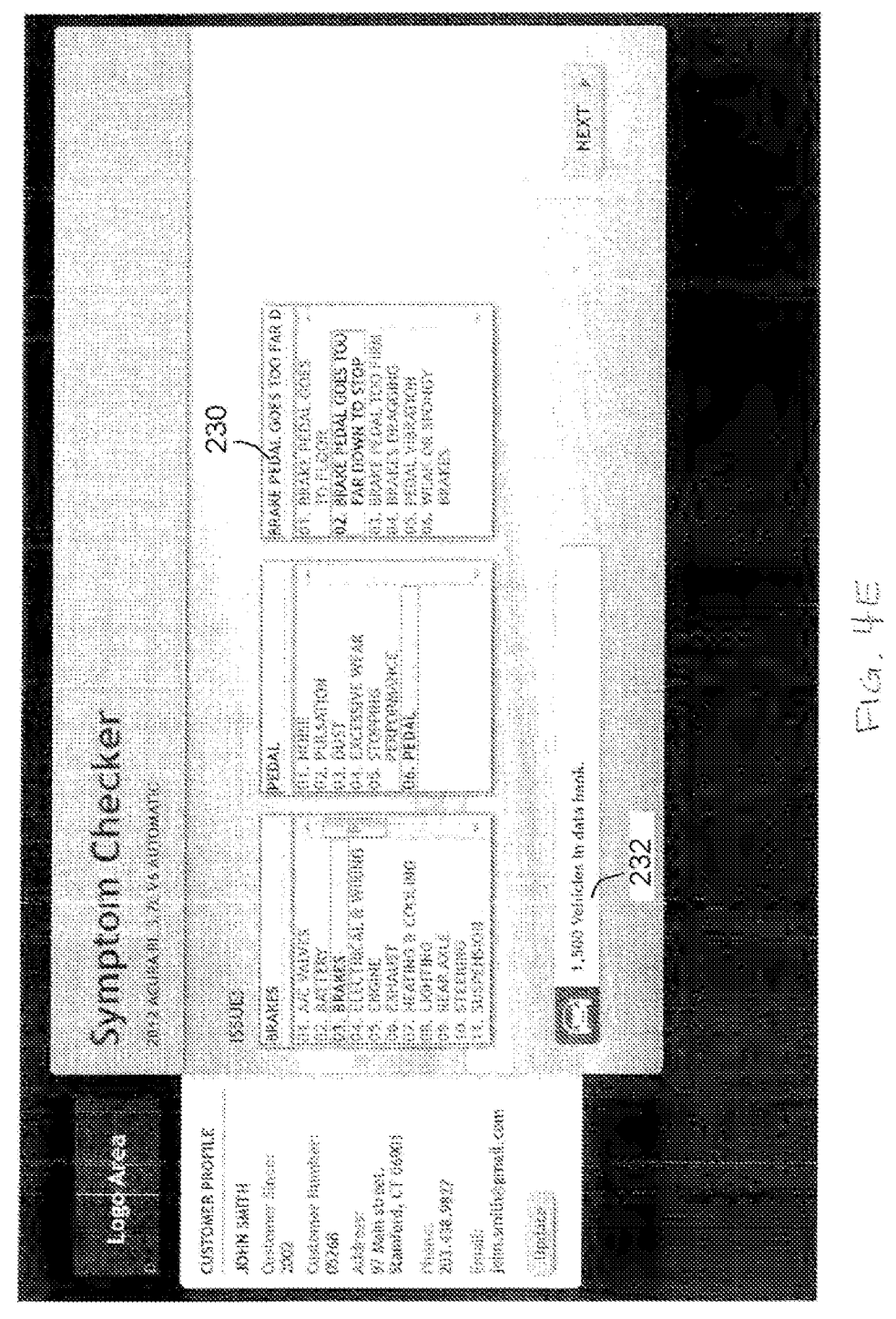

Turning now to FIG. 4D, and generally with reference to steps 126 through 144 of FIG. 3, once the vehicle is selected at either 106 or 122, the employee queries the customer at step 126 with respect to the issue he is having with the vehicle. For such purpose, the GUI at step 128 presents a menu at 224 with categories of areas in a vehicle (which may be specific to the selected vehicle type) for the customer to indicate as the location and general issue of the problem. The customer relates the area, and the area is selected on the menu at step 130. Once the area is selected at 130, the database is accessed 132 to identify and update at 134 the vehicle count of vehicles in the database that were previously brought in for repair or resolution for the same trouble area on the same vehicle type as the customer's vehicle. Identifying the problem area or a problem area and a general issue may require one or more queries. The corresponding vehicle count is also provided for display at step 134 after the one or more queries, as shown at 228 on the GUI.

After the area and optionally general issue are identified, the customer may again be queried at step 136, with the GUI menu presenting menu selections to specifically identify the symptom at 230. The symptom is selected at step 140. The database is preferably again accessed at step 142 to identify and update at step 144 the vehicle count of vehicles in the database that were previously brought in for repair or resolution for the same symptom to the trouble area(s). The corresponding updated vehicle count is provided for display also at step 144, as shown at 232.

Then, based on the historical repair data associated with the vehicles comprising the vehicle count, the system identifies at step 146 all of the repairs that have been performed on vehicles with like issues within the vehicle count. Based upon the historical repairs, the confidence level of each such repair as a potential repair for the customer vehicle is calculated at step 148, and then the potential repairs are ranked at step 150 in order of the confidence level, from greatest confidence to lowest confidence. A summary page for the customer's vehicle requiring repair is presented as FIG. 4F. The customer's vehicle type is indicated at 234. The general area for repair is identified at 236, the specific area is identified at 237, and the symptom needing repair is identified at 238. All of the historical fixes are displayed, indicating their respective rank 240 and confidence level 242. In addition, for a vehicle that was previously linked to the customer (as determined back at steps 104 and 106), any notes associated with vehicle's prior repair history are provided for display at step 154, and shown at 244. Also, any other notes or notices associated with the vehicle type in general are displayed or with respect to the identified issue specifically, such as Vehicle Service Bulletins from the manufacturer indicated at 246 or Recall Notices from the Department of Transportation indicated at 248. From this display of information, or at least a subset thereof, it can be indicated to the customer the most likely repair for the vehicle (that having the highest confidence level and the highest rank).

Figure 4F:
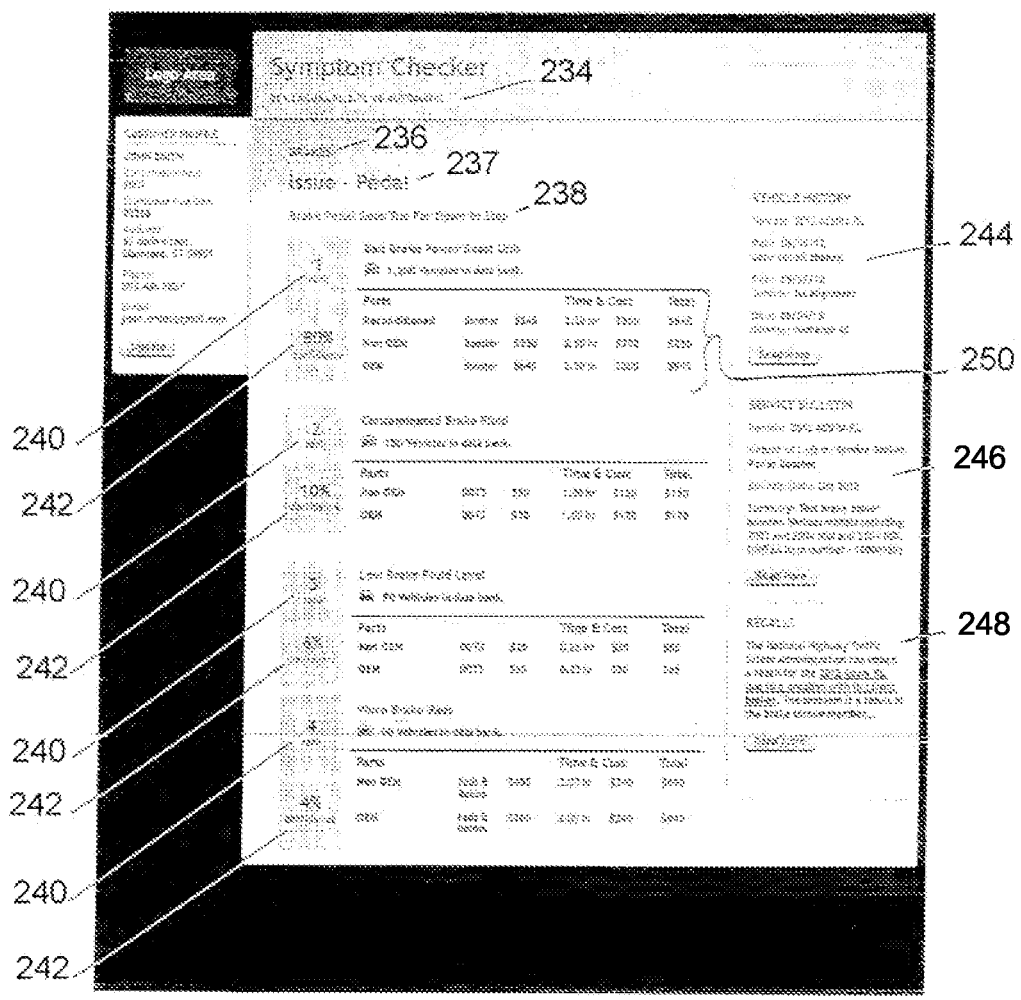

In addition, along with displaying the various potential repairs, the system calculates at steps 158 and 160 an estimated cost for each of the repairs. It is possible to calculate and/or display each of the repairs at once for display at the same time, as shown in FIG. 4F, or to calculate each respective potential repair on selection, as indicated at step 156. It is recognized that calculating all repairs provides the information all at once, but is more processor intensive to the system, whereas calculating the repair costs only on selection will provide a decreased amount of information initially but allow the system to run leaner with decreased demand on processing resources. Once the repair costs are calculated, they are provided at 162 for display as shown at 250.

The top-ranked repair may not eventually be the correct repair for the customer's vehicle—it is recognized that a diagnostic or other physical evaluation may be necessary to determine the actual cause of the problem to the vehicle. Nevertheless, the information provided by the system, both in terms of the potential causes of the issue, as well as the range of the costs for the repairs, is anticipated to be valuable knowledge for the customer to have prior to making a decision as to whether to leave their vehicle with a VSC for physical evaluation. It allows non-technical employees to gather non-technical information that can be gathered without evaluating the vehicle, and provide to the customer knowledge that they would not otherwise have, including estimates of what is the problem (including several potential problems), and what the repair costs are for each. Further, as the database is developed, the results of the ranking will have greater probability of being the correct result for each vehicle under evaluation for repair.

Figure 5:
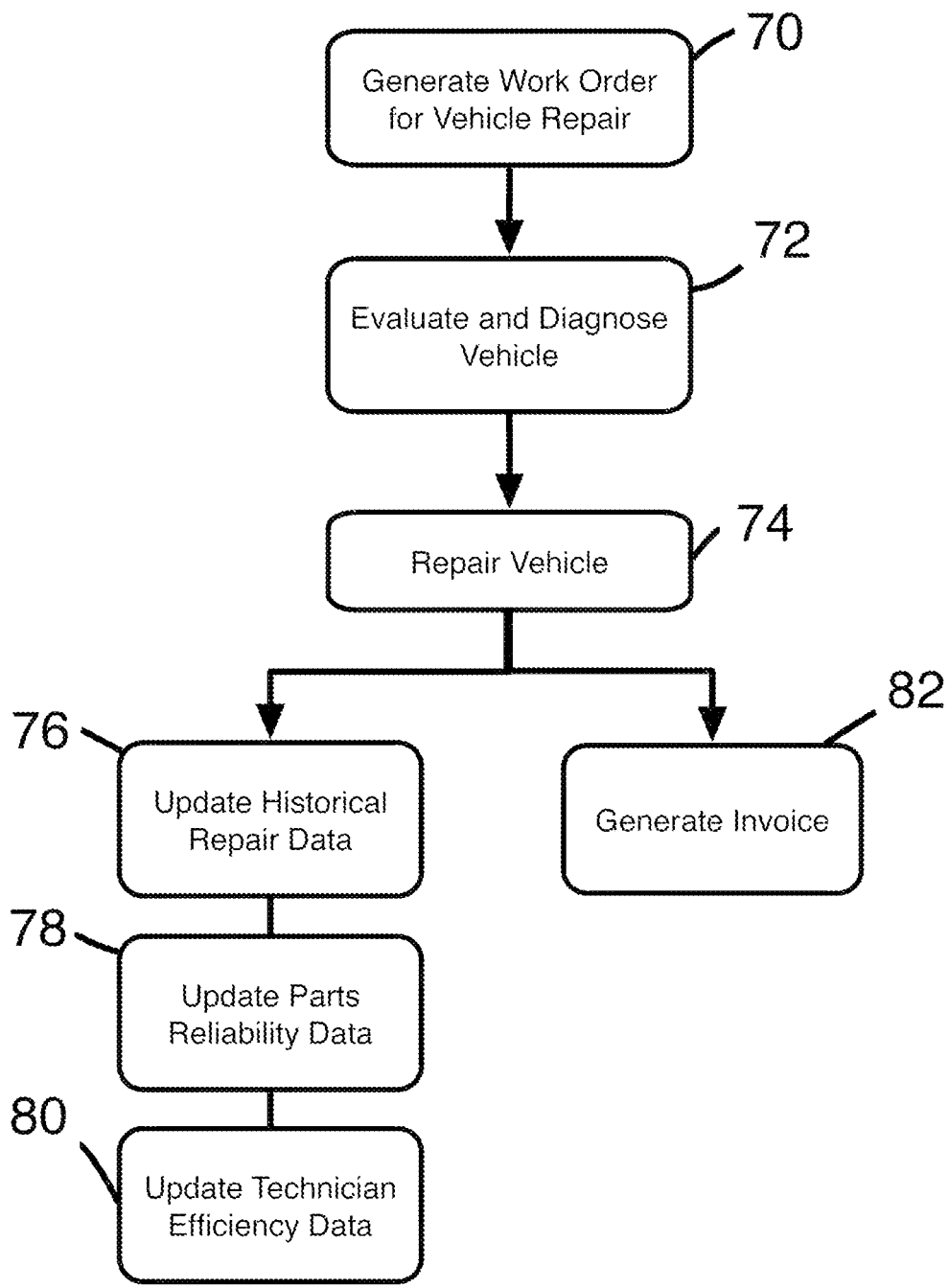
FIG. 5 is a flowchart illustrating another portion of the method according to the system.

Referring now to FIGS. 1, 2 and 5, assuming the vehicle is subsequently left for repair at the VSC 24, a work order can be ordered and generated at 70 from the POS terminal 22 and sent to the technical terminal 66. The work order can indicate all relevant customer information, vehicle type information, the identified area of the problem, the indicated symptoms, and the calculated ranking of potential resolutions.

The vehicle is taken up for evaluation and diagnostics at 72, with the technician determining the actual problem and the actual resolution required. Once the problem with the vehicle is diagnosed, the repair is effected at 74. If the intended repair is determined to be different than that initially indicated to the customer at the estimate, the customer can be contacted for prior approval. Once the repair is complete and a determination has been made as to the actual repair required to resolve the issue with the customer's vehicle, the historical repair data 42 is updated at 76 to indicate that for the vehicle type data (make, model, year, etc.) 36, with the reported symptom 40 to the specified area 38, what repair was actually performed. The part reliability database 51 is also updated at 78 to store the source and/or brand of the parts replaced and installed. And the technician database 64 is updated at 80 to store the time required for the technician to perform the repair, and a calculation is or can be later performed to update the technician's efficiency with respect to the type of repair performed. An invoice for the actual work performed is also prepared at 82.

The flow chart and menu operates similar for a customer operating outside the VSC and who may access the VSC from, e.g., a web site. Vehicle information is entered or an account can be established and vehicle data stored and selected. Then, in the same manner, the area, both general and specific can be identified, and the symptom is selected. Potential (and optionally ranked) repairs are provided by the system to the customer. It is not necessary that all of the same information be provided. For example, the rank or confidence level may or may not be provided to the customer. Also, the estimate cost data may be provided or not provided. The system operates as a lead generator, which directs the customer to a VSC to have a vehicle diagnostic, evaluation, and repairs performed. The customer is provided with the location of a VSC. Such location can be based on geolocation of the customer based on the device used to access the web site. For example the web site can be accessed on a mobile phone, tablet, desktop or laptop computer. The customer can pre-register for an appointment on a particular date at a particular time. The customer can reserve a shuttle service provide by the VSC. Other options may be made available and are within the scope of the invention.

There have been described and illustrated herein several embodiments of methods for estimation of a vehicle repair prior to diagnostic or technician evaluation of the vehicle and estimation of the costs for such repair prior to diagnostic or technician evaluation, and systems for carrying out the same. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its scope as claimed.

What is claimed is:

1. A system for use with a plurality of networked point-of-sale (POS) terminals located at respective vehicle service centers (VSC) for providing a pre-diagnostic estimation of repair that is be required to be performed on a particular vehicle which has been reported to have certain reported issues, the system comprising:
   a) a database of vehicle data including (i) vehicle types, (ii) issue data of issues associated with the vehicle types, and (iii) repair data of repairs performed to correct the issues for each of the respective vehicle types;
   b) a logic service configured to,
      (i) query the vehicle data in the database to identify a vehicle type that is the same as the particular vehicle,
      (ii) query the vehicle data to identify vehicles of the vehicle type that have previously been reported to have the same reported issue as the particular vehicle,
      (iii) query the vehicle data to identify the one or more repairs that have been performed to repair the reported issue for the identified vehicle type, and
      (iv) determine a confidence level for each of the identified one or more repairs as to whether the identified one or more repairs is the correct repair for the reported issue with the particular vehicle, wherein the logic service is configured to calculate the confidence level for each distinct type of repair by:

$$\frac{\text{vehicle count of vehicles requiring the distinct type of repair to resolve the issue}}{\text{vehicle count of all vehicles repaired for the same issue}};$$

and
   c) a bridge operably coupled to the database and logic service to place the database and logic service in network communication with the plurality of POS terminals.

2. A system according to claim 1, wherein the repair data in the database is dynamic.

3. A system according to claim 2, wherein the repair data is updated after the particular vehicle is repaired to store the actual repair performed on the particular vehicle in the repair data so that when the database is subsequently queried by the logic service, the repair data includes such additional repair data.

4. A system according to claim 3, wherein the database is adapted to update the repair data automatically.

5. A system according to claim 1, further comprising:
the plurality of point-of-sale (POS) terminals, each POS terminal having a user interface at which to implement the queries of the logic service on the database, and an invoicing system to invoice customers for completed vehicle repairs.

6. A system for providing a pre-diagnostic estimation of a repair that is required for a particular vehicle which has been reported to have certain issues, the system comprising:
a) a first database of vehicle data including (i) vehicle types, (ii) issue data of issues associated with the vehicle types, and (iii) repair data of repairs performed to correct the issues for each of the respective vehicle types;
b) a logic service configured to,
(i) query the vehicle data to identify a vehicle type that is the same as the particular vehicle,
(ii) query the vehicle data to identify vehicles of the vehicle type that have previously been reported to have the same reported issue as the particular vehicle,
(iii) query the vehicle data to identify the one or more repairs that have been performed to repair the reported issue for the identified vehicle type, and
(iv) determine a confidence level for each of the identified one or more repairs as to whether the identified one or more repairs is the correct repair for the reported issue with the particular vehicle, wherein the logic service is configured to calculate the confidence level for each distinct type of repair by:

$$\frac{\text{vehicle count of vehicles requiring the distinct type of repair to resolve the issue}}{\text{vehicle count of all vehicles repaired for the same issue}};$$

c) at least one terminal having a user interface with an input and a display, the display adapted to display the identified one or more repairs; and
d) a bridge that operably couples the first database and the logic service to the terminal over a telecommunications network so that the terminal can input and/or select vehicle data, and the display can display results of queries and determinations by the logic service.

7. A system according to claim 6, wherein the repair data in the first database is dynamic.

8. A system according to claim 7, wherein the repair data in the first database is automatically updatable after the particular vehicle is repaired to store in the repair data, data corresponding to the actual repair performed on the particular vehicle so that when the database is subsequently queried by the logic service, the subsequent query is performed on the updated repair data.

9. A system according to claim 6, wherein the at least one terminal is a point-of-sale terminal adapted for use in a vehicle service center.

10. A system according to claim 6, wherein the at least one terminal is a located outside of a vehicle service center.

11. A system according to claim 10, wherein the at least one terminal includes an invoicing system to invoice a customer for a repair to the particular vehicle.

12. A system according to claim 6, wherein the terminal is a consumer device and the telecommunications network is the Internet.

13. A system according to claim 6, wherein the first database includes cost data to estimate a cost to perform a repair on the particular vehicle.

14. A system according to claim 6, further comprising:
a second database is provided local to the at least one terminal,
wherein the first database includes first cost data required to estimate a cost to perform a repair on the particular vehicle, and the second database includes second cost data required to estimate the cost to perform the repair on the particular vehicle.

15. A system according to claim 14, wherein the first cost data includes at least one of parts required for the repair and estimated labor time for the repair, and the second cost data includes at least one of cost of parts and a labor rate per hour.

16. A system according to claim 6, further comprising:
a second database including data associated with reliability of parts from different brands or vendors for a part required to be repaired or a part required to perform the repair.

17. A method for estimating a diagnosis of a particular vehicle in need of repair prior to performing diagnostics on or otherwise physically evaluating the vehicle, comprising:
a) providing a first database of vehicle data including (i) vehicle types, (ii) issue data of issues associated with the vehicle types, and (iii) repair data of repairs performed to correct the issues for each of the respective vehicle types;
b) querying the first database to,
(i) identify vehicle types that are the same as the particular vehicle,
(ii) identify vehicles that have been previously reported to have the reported issue of the particular vehicle, and
(iii) identify the one or more different types of repairs that have been previously performed to repair the identified vehicles that have had the reported issue;
c) performing a logic function with respect to the identified vehicles and different types of repairs to determine a confidence level for each of the one or more distinct types of repairs, the confidence level calculated for each distinct type of repair by:

$$\frac{\text{vehicle count of vehicles requiring the distinct type of repair to resolve the issue}}{\text{vehicle count of all vehicles repaired for the same issue}};$$

and
d) displaying on a display of a user interface at least a portion of the identified one or more distinct types of repairs and a metric associated with the confidence level for the portion of the identified one or more distinct types of repairs.

18. A method according to claim 17, further comprising:
displaying on the display the portion of the identified distinct types of repairs in a ranked order corresponding to the respective confidence level of each.

19. A method according to claim 17, wherein steps b), c) and d) are performed prior to performing diagnostics on the particular vehicle.

20. A method according to claim 17, wherein steps b), c) and d) are performed prior to a physical technical evaluation of the particular vehicle.

21. A method according to claim 17, wherein steps b) and d) are performed at a point-of-sale (POS) terminal in a vehicle service center, and the user interface is coupled to the POS terminal.

22. A method according to claim 21, further comprising:
repairing the vehicle; and
invoicing a customer for repair to the particular vehicle, wherein the at least one POS terminal includes an invoicing system.

23. A method according to claim 17, wherein the user interface is integrated with a consumer device.

24. A method according to claim 17, further comprising:
repairing the vehicle; and
updating the repair data in the first database so that the repair data includes data for the particular vehicle with respect its vehicle type and the reported issue queried.

25. A method according to claim 17, further comprising:
identifying from a second database replacement parts from sources having higher reliability over time than replacement parts from other sources.

26. A method according to claim 17, further comprising:
estimating a cost to perform at least one of the displayed distinct types of repairs; and
presenting the estimated cost for each of the at least one displayed distinct repairs together on the user interface.

27. A method according to claim 26, wherein the estimating including calculating parts required, cost of parts, service time required, and labor rate at a location performing the repair.

28. A method according to claim 17, wherein the first database is queried by a potential customer.

29. A method according to claim 28, wherein the first database is queried from a location offsite of a vehicle service center.

30. A method according to claim 29, further comprising:
directing the potential customer to one or more vehicle service centers in a designated geographical vicinity of the potential customer.

31. A method according to claim 28, further comprising:
generating an appointment for the potential customer at a particular vehicle service center so that the potential customer can have the vehicle repaired.

* * * * *